Jan. 19, 1971  R. E. FUTER  3,555,693
METHOD AND APPARATUS FOR TREATING PIECES OF
MATERIAL BY MICROWAVES
Filed Sept. 27, 1968  3 Sheets-Sheet 1

INVENTOR:
RUDOLPH E. FUTER
BY: Milmore & Cypher
HIS ATTORNEYS

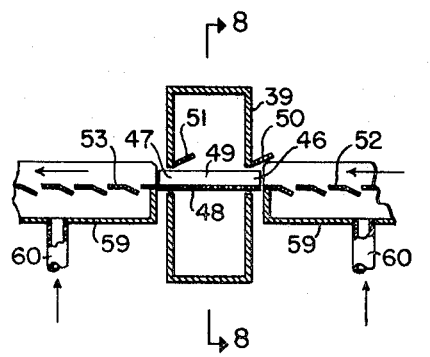
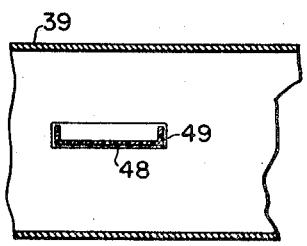
FIG. 7  FIG. 8
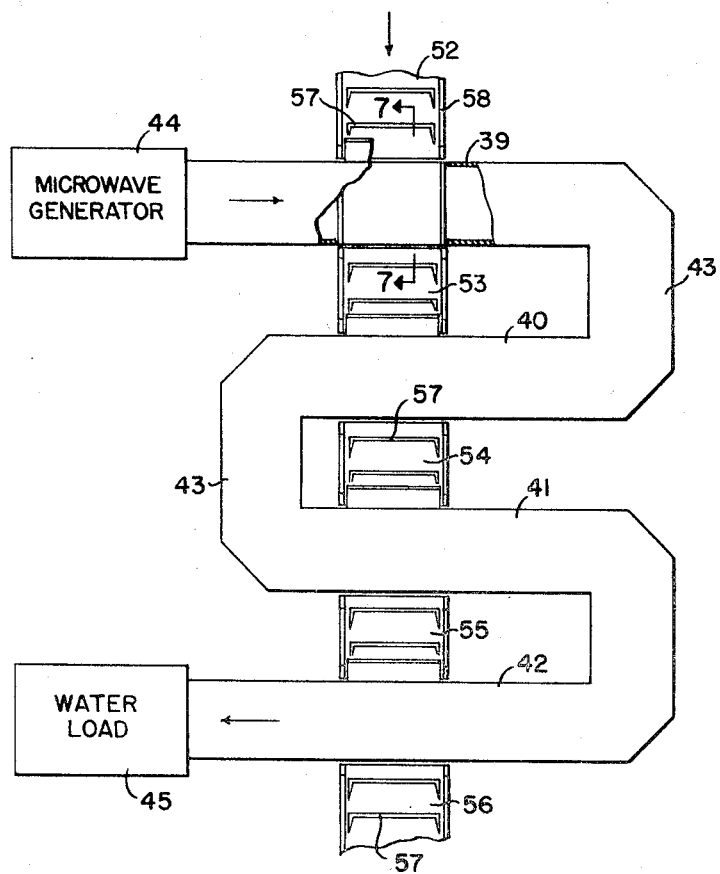
FIG. 6
INVENTOR:
RUDOLPH E. FUTER
BY: *Milmore & Cypher*
HIS ATTORNEYS Jan. 19, 1971   R. E. FUTER   3,555,693
METHOD AND APPARATUS FOR TREATING PIECES OF
MATERIAL BY MICROWAVES
Filed Sept. 27, 1968   3 Sheets-Sheet 3

INVENTOR:
RUDOLPH E. FUTER
BY: *Milmore & Cypher*
HIS ATTORNEYS

United States Patent Office 3,555,693
Patented Jan. 19, 1971

3,555,693
METHOD AND APPARATUS FOR TREATING PIECES OF MATERIAL BY MICROWAVES
Rudolph E. Futer, Oakland, Calif., assignor to Bangor Punta Operations, Inc., Hayward, Calif., a corporation of New York
Filed Sept. 27, 1968, Ser. No. 763,130
Int. Cl. B01k 5/00
U.S. Cl. 34—1            16 Claims

ABSTRACT OF THE DISCLOSURE

Pieces of material, e.g., from a few microns to several centimeters in diameter, are treated by microwaves, e.g., to dry or heat it or produce some other change therein, by passing microwaves through a microwave-confining chamber, such as a wave guide, having inlet and outlet openings, introducing the pieces from an air jet table on which the pieces are propelled by gas into the inlet opening, conveying the pieces through the chamber on an internal table and out through the outlet opening onto a discharge jet table, and sweeping the pieces after having received at least some microwave energy with gas while maintaining a separation between the pieces of at least one diameter to remove surface phenomena, such as moisture and heat, to disrupt the boundary layer at the surfaces of the pieces. The internal table can be a jet table, whereby the pieces are gas-propelled and swept with gas while within the chamber; or the internal table may be passive and imperforate, whereby the pieces are gas-propelled and swept on the discharge table. In the latter case preferably a series of chambers is provided. The gas current is formed by supplying gas under pressure to the underside of each jet table, which has passages extending therethrough and directed to emit gas jets having major flow components parallel to and along the table.

---

The invention relates to a method and an apparatus for treating pieces of material with microwaves, as for drying or heating or producing some other effect in the material, and is principally concerned with improvements in the handling of the material to improve its change in state and in conveying the material through the enclosure which confines the microwave energy.

Microwaves are electromagnetic waves possessing energy and having frequencies which permit the waves to be led through wave guides, typically between about 0.03 and 3,000 gHz. ($3 \times 10^7$ to $3 \times 10^{12}$ cycles per second). As appears below, frequencies from 0.03 to 100 gHz. are principally of interest in connection with the invention.

The capabilities of microwaves to heat or dry material are known, as are the construction of interconnecting wave guides and applicators which direct or concentrate microwave energy on material. Important characteristics are preferential coupling of microwaves to liquids, such as water, aqueous and non-aqueous liquids, which may be absorbed in or absorbed on the material, and the speed with which the energy is transferred to such liquids. The commercial application of this technique to the preparation of foods represents the largest current use of microwave treatments, and materials such as grain, cereal, comminuted potato and flour are treated for drying and/or cooking them. However, other materials, such as plastic powder or nibs, sawdust, wood chips, pharmaceuticals, chemicals and sand in the form of pieces, can be similarly treated. Other purposes of the treatment, involving side effects of the radiation (i.e., the microwave energy) such as changes in the crystalline structure and chemical changes, are also contemplated in this invention; these effects are not well understood but are under investigation by others.

Rerefence will be made herein principally to drying, which is currently the most common application of microwave techniques, but it will be understood that the treatment may be for other purposes.

A microwave treating system normally includes a microwave generator (having a suitable power supply, including a magnet voltage supply and an energy dissipation unit), an applicator through which the radio-frequency or microwave energy from the generator is propagated, means for passing the material through the applicator to expose it to the microwave energy, and, usually, a dummy load, such as a water load isolated from the applicator by a diaphragm, to permit full-power operation with or without the presence of a work piece and prevent reflection of energy to the generator. The applicator is a "microwave-confining chamber," a term which is herein used broadly to include wave guides in the form of tubes of rectangular or circular cross section and other enclosures which confine microwaves, which may include devices for concentrating the microwave energy at a particular region of the chamber.

Optionally, the system may include a monitoring device which measures a property of the treated material, such as its dryness, and a controller which controls the power output of the generator in accordance with the measurement. The generator includes a suitable cavity, such as a magnetron or klystron, which generates microwaves of the desired frequency.

The construction of microwave treating systems, the dimensions of the wave guides and other forms of applicator chambers for preferred modes of propagation of the energy, means for directing or focussing the maximum or suitable energy on a specific region of the chamber, suitable materials of construction, and optimum frequencies for specific purposes, are known and are not, therefore, described herein.

It is important to prevent the entry into the applicator chamber of materials which interfere with the propagation of microwave energy, such as metallic or magnetically susceptible objects; for this reason non-metallic conveyors, such as fabric, glass or plastic belts, have been used to convey the material through the chamber. Such belts have several drawbacks, including rapid deterioration due to wear and prolonged exposure to microwaves and to the heated material, spillage of material and, especially when small particles are treated, the need for special equipment to load the belt in a way to produce thereon a layer of uniform thickness.

It is also known to move small particles through an applicator chamber as a dense fluidized bed, e.g., on a vibrating supporting plate within the chamber and aerating the bed. In such a bed the interval between particles is less than the diameter of the particles. Again the presence of moving parts within the chamber is a drawback, for reason of wear and, unless constructed of special materials that are transparent to microwaves, of altering the mode of propagation of the microwaves.

Neither the belt nor the dense fluidized bed techniques of handling the material to be treated have developed the maximum speed of treating materials because they did not remove surface phenomena from the work pieces sufficiently fast. For example, in the case of drying, the microwaves couple with the moisture within the work pieces and drive it to the surface; or, in the case of adsorbed surface moisture, vaporize it. In both cases the moisture appears as a thin layer which envelopes the work piece and the rate at which this is removed often governs the rate of drying. A moving belt carries the pieces in close or intimate contact with each other, and the surface moisture cannot be effectively removed. Similarly, a dense fluidized bed was found to be deficient in the rate of removal of moisture vapor from the surfaces and to exhibit a proximity effect between the particles. Perhaps the deficiency is in part due to the flow of a large proportion of the aerating gas through gaps which form in the bed, whereby most particles are engaged by only a fractional part of the gas; another cause may be the limited velocity of the gas relative to the particles.

Similarly, the removal of surface heat is often necessary and is difficult to achieve effectively with moving belts or dense fluidized beds for the reasons stated.

The principal object of the invention is to provide a method of microwave treating and a microwave treater in which separate pieces of material are effectively swept with a gas current after absorbing at least a part of the microwave energy in a manner to effect the rapid removal of surface phenomena, such as surface moisture driven to the surface and occurring as liquid or vapor or moisture vaporized on the surface, or heat.

Another object is to pass the material through the microwave treater without moving mechanical parts. An ancillary object, attained in some embodiments, is to increase the capacity of the treater by providing a greater rate of motion of the material than was possible with a belt conveyor or a vibrating plate supporting a fluidized bed.

In summary, according to the invention, microwaves of suitable frequency are propagated through a microwave-confining chamber, the work pieces are introduced into and removed from the chamber through spaced inlet and openings and moved individually between said openings on a stationary internal table surface which is situated within the chamber, preferably by gas propulsion or momentum created by gas propulsion, and the pieces are swept with a gas current formed by a plurality of gas jets after the pieces have absorbed at least some microwave energy while maintaining a separation between said pieces of at least one diameter.

The term "piece" is used herein to include small particles, having maximum dimensions as low as 100 microns or less, and larger pieces having minimum dimensions up to about 1.0 cm., such as sheet-type material, paper or pulp. The "diameter" of a piece which is not spherical is the average of three mutually perpendicular dimensions.

In one embodiment, the gas jets are formed by flowing gas through gas passages formed in the internal table inside of the chamber to form jets having major flow components along the table toward the outlet opening, and the pieces are maintained separated and are propelled and swept by gas while within the chamber, so that exposure to microwaves and sweeping with gas occur simultaneously. In a second embodiment, the pieces are passed through a succession of wave guide sections and moved between the sections on intervening jet tables having gas passages directed to form gas jets with major flow components along the intervening tables in the direction of movement of the pieces; usually an additional feed jet table and discharge jet table, which similarly form gas jets, are provided in advance of the first and after the last section. In this embodiment the pieces are maintained in spaced relation and are propelled and swept wtih gas on the intervening tables (and the discharge jet table, when provided), following each exposure to microwaves within a section, so that the gas-sweeping is again contemporaneous with the microwave treatment. In the second embodiment the internal tables may be jet tables, i. e., similarly provided with gas passages, or they may be imperforate; when they are imperforate the internal tables are passive and the pieces move thereon by momentum created by gas propulsion on a feed jet table.

In either the first or second embodiment the internal table may be a separate plate positioned in spaced relation to the top and the bottom of the chamber or may lie on or be constituted by the chamber bottom. Therefore the internal tables are herein sometimes spoken of as table means. The means for supplying gas under pressure to the under side of a jet table is preferably a plenum chamber. When the internal table means is a jet table and is spaced above the applicator chamber bottom, the plenum chamber is usually inside of the applicator chmaber, e.g., being defined by the jet table and the walls of the applicator chamber; and the plenum chamber is beneath the applicator chamber when the bottom of the latter forms the internal jet table means.

When the internal table means is separate from the wave gide bottom, it may be formed of material, such as glass or plastic, e.g., Mylar, or polypropylene, which is transparent to microwaves.

The gas passages may be formed by depressing parts of the jet table along incisions to provide inclined portions when the table is of metal or certain plastics. The passages may have any desired shapes, e.g., they may be slots which extend across most or half of the table, or may be smaller. When the jet table is formed of glass or certain plastic materials, the passages may be drilled or formed when casting or molding the table.

Advantageously, the gas passages are located in closely spaced relation along the direction of movement of the pieces so that each jet issues next to at least one other jet from a gas passage situated farther upstream which other jet is still in being. Thereby successive gas jets cooperate to form a gas current which has a greater velocity component parallel to the table surface than would be attained by individual, non-cooperating gas jets of the same size, direction and velocity. Thereby a more efficient utilization of the gas is realized, and there is a reduced tendency for the work pieces to be blown off the table into the upper part of the wave guide or off an external jet table.

The concept of a jet which is "in being" will be understood by considering that as a gas jet moves from its origin, gas diffuses laterally and the forward momentum of the jet decreases. At a certain distance from the origin, herein called the "throw" distance, the jet is dissipated and no longer in being. For the purpose of this specification, this point is that at which the velocity pressure of the jet, when moving through otherwise still air, is reduced to 10% of its original velocity pressure as measured, e.g., by a pitot tube pointed upstream of the jet, all pressures being relative to the static pressure of the air immediately outside of the jet.

When such closely spaced jets are provided in a jet table, the velocity component of the resulting gas current parallel to the table increases progressively through several, such as three to five successive jets, as is explained and illustrated by graphs based on experimental data in my U.S. Pat. No. 3,268,585, Aug. 23, 1966. It may be that each jet which emanates beneath another jet which is still in being is deflected toward the table, causing the resulting gas current to flow more nearly parallel to the table surface; however, no theory of the nature of this cooperative effect is herein relied upon.

When the pieces are moved on a table provided with such gas jets a dilute phase bed is formed, in which the individual pieces are spaced apart by distances in excess of one diameter thereof. Further, the pieces are swept by the gas current because they move at a speed less than the jet velocities at the gas passages. This will be explained further hereinafter.

The invention will be further described with reference to the accompanying drawings forming a part of this specification and showing certain illustrative embodiments, wherein.

Figures 2, 3:
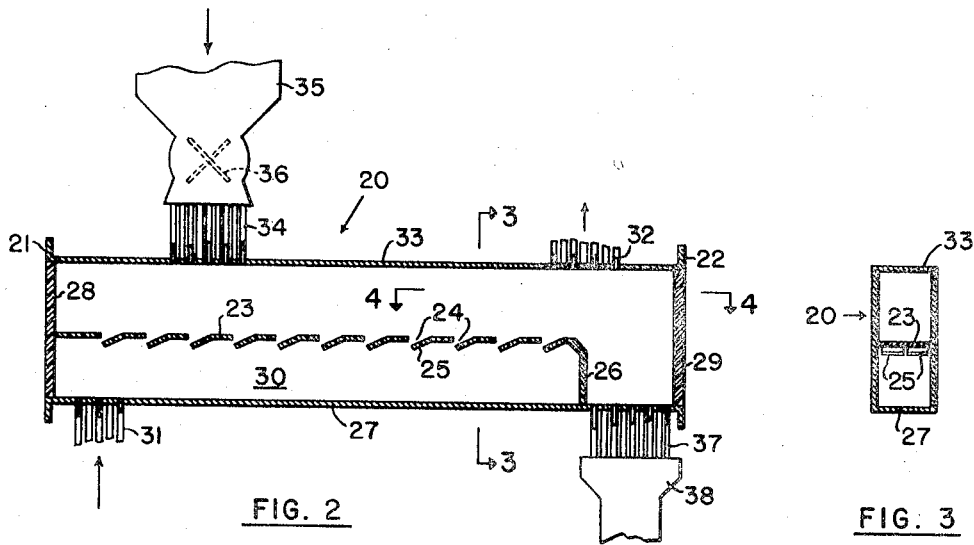
FIG. 2 is a central longitudinal section through a wave guide having an internal jet table.
Figure 4:
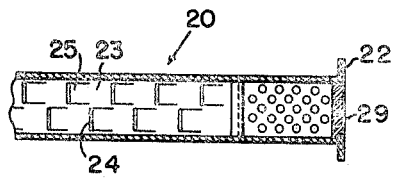
Figure 5:
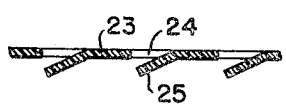
Figure 9:
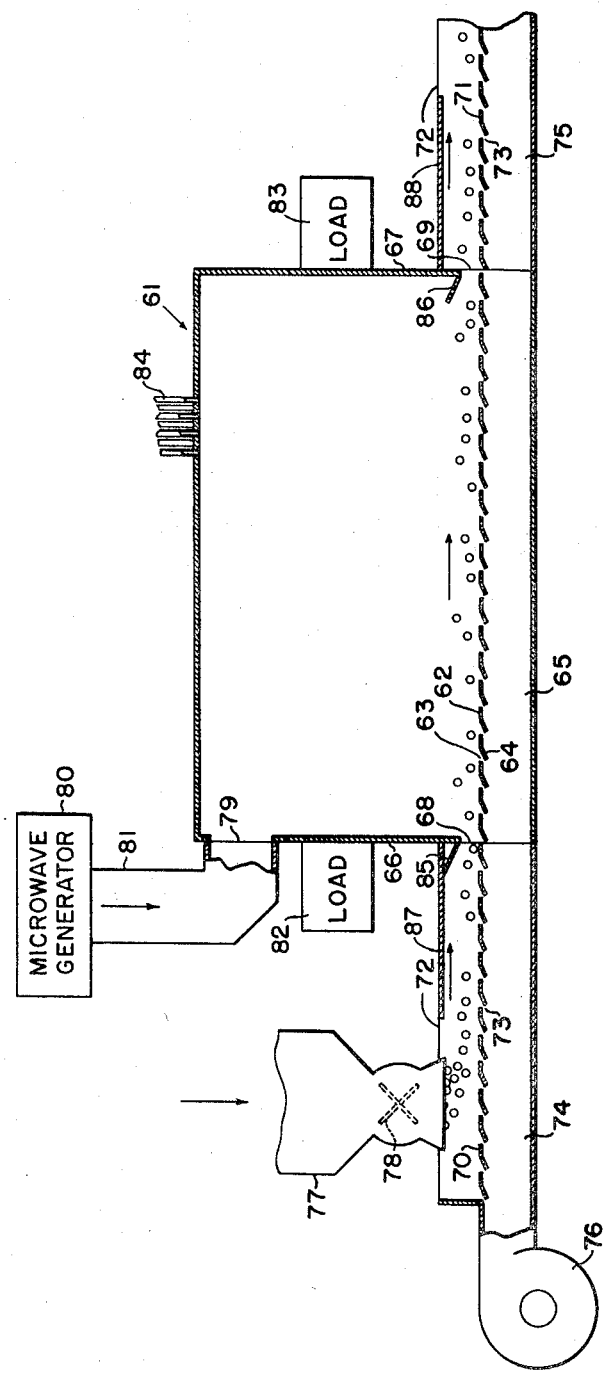

FIGS. 3 and 4 are sections taken on the lines 3—3 and 4—4, respectively, of FIG. 2;

FIG. 5 is an enlarged fragmentary sectional view of the jet table;

FIG. 6 is a plan of another embodiment, using a plurality of serially connected wave guide sections;

FIG. 7 is a section taken on the line 7—7 of FIG. 6;

FIG. 8 is a section taken on the line 8—8 of FIG. 7;

FIG. 9 is a central section through a third embodiment, using a cavity; and

Figure 10:
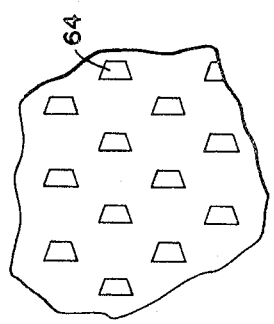

FIG. 10 is a fragmentary plan view of a portion of the chamber floor of FIG. 9, shown to an enlarged scale.

Figure 1:
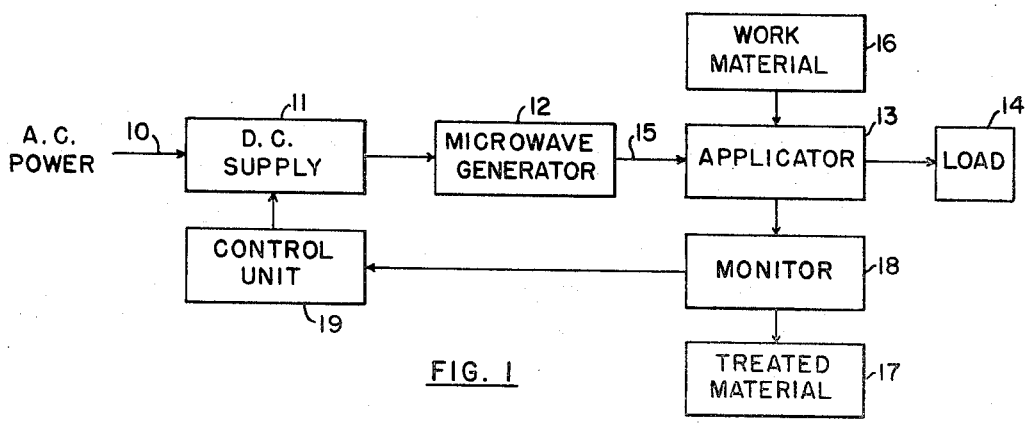
FIG. 1 is a block diagram of a microwave treating system.

Referring to FIG. 1, A.C. power from a line 10 is supplied to a D.C. power supply unit 11, which energizes an applicator 13 of suitable design, herein called a microwave-confining chamber, which has a dummy load 14 and is coupled to the generator by an interconnecting wave guide represented at 15. The work material to be treated is moved from a source 16 through the applicator and treated therein and is discharged to a receiver 17. Optionally, there may be a monitoring device 18 which measures a property of the treated material and is connected to a controller 19; the latter controls the D.C. power supply to the unit 11 in accordance with the measurement made by the monitoring device.

The frequency of the generator is selected on the basis of the change to be effected in the material and other practical factors. The natural resonant frequency of water is in the vicinity of 22 gHz., and hence a frequency not too different between 0.1 and 100 gHz. is normally used. Practical considerations must be heeded. Thus, the highest frequencies transfer only little power, and large commercial equipment for the highest frequencies are not currently available. Also, only certain specific frequency bands are, at present, authorized by regulatory bodies such as, in the U.S.A., the Federal Communications Commission; it authorizes only narrow bands which include the frequencies 0.013, 0.30, 0.915, 2.45, 5.80 and 22.50 gHz. for industrial purposes without limitation on radiated power levels. Hence, frequencies between 0.03 and 100 gHz. are of principal interest herein.

Referring to FIGS. 2–5, the microwave-confining chamber for applying the energy to the material is shown as a wave guide 20, having flanges 21 and 22 for connecting it to the generator, usually through an interconnecting wave guide, and to another wave guide section or to a dummy load, respectively. The section 20 contains an internal jet table 23 having a multitude of closely spaced gas passages 24, e.g., slots arranged in two staggered rows and formed by depressing tabs 25 downwards or when casting or molding the table. The gas passages are inclined to form jets with axes that are predominantly horizontal, preferably less than 30°, e.g. 5–18°, to the surface of the table. The sizes of the gaps between the edges of the tabs and the edges of the flat table are preferably small, typically 1 to 4 mm., and the total open area is a small fraction, typically 2–5% of the table area. The spacing depends in part on the gas pressure, and intervals of 3 to 15 cm. are typical. In this embodiment the gradient of the wave guide 20 and the table 23 is less than 45° to the horizontal along its length, e.g. zero gradient as shown. A vertical wall 26 extends downward to the bottom wall 27 of the wave guide and is spaced from the end of the guide. Diaphragms or barrier walls 28 and 29 extend across the ends of the guide. The parts 26, 28 and 29 must be formed of material such as glass or polypropylene which is substantially transparent to microwaves. When special focussing devices are not employed it is preferred to make the table 23 also of such transparent material and to locate it with its upper surface at the midheight of the wave guide, as shown.

The bottom wall 27, the lower sides of the wave guide and the vertical walls 26 and 28 define a plenum chamber 30. Gas under pressure is admitted thereto by a gas inlet 31, which flows through the passages 24 and is discharged through a vent 32 formed in the top wall 33 of the wave guide. This wall also contains an inlet 34 for the material to be treated, advantageously situated in spaced relation to the wall 28 so that there will be several passages 24 upstream from the charge zone. Thereby a gas current will be well formed before engaging the material, and this promotes effective flow of the material. This material, in the form of separate pieces, is supplied from a suitable source, such as a hopper 35 at a rate controlled by a suitable controller, such as a star feeder 36. An outlet 37 for the treated material extends through the bottom wall 27 and discharged into a receiver 38.

The inlets 31 and 34 and outlets 32 and 37 are shown as formed from bundles of metallic tubes, for maintaining the microwave-transmitting characteristics of the wave guide and limiting the escape of microwave radiation, which can be injurious to personnel. However, depending upon the energy levels, other constructions, such as screens or egg crate structure, can be used.

In operation, gas which is compatible with the material, usually air, is admitted at 31, at a pressure to cause gas jets to flow through the passages 24 at velocities preferably high enough to cause jet cooperation, e.g., 500 to 2200 cm. per sec. Typical gas pressures are 5 to 30 cm. of water. The gas jets form a current which is formed already upstream of the charge zone, where the individual pieces fall from the inlet 34 and are propelled by the gas to move along the length of the jet table. The pieces move less rapidly than the gas jets, partly due to engagement with the table and because their velocity is, at most, the average forward velocity of the gas current, while the individual jets have far higher velocities. Thus, tests performed with a pitot tube have shown that the forward velocity is highest where the jets issue and falls to a value between 30 and 65% of the maximum in the space between passages, depending upon the spacing and rate of gas flow. This action creates a dilute dispersion, in which the pieces are separated by distance greater than one diameter, thereby effectively sweeping them with gas having a sufficient relative velocity to disrupt the boundary layer enveloping them and remove suface phenomena, such as moisture and heat. Because the pieces are tumbled they are randomly swept on all sides by the gas. In moving along the table the pieces tend to remain near to the table surface and are not carried far above it. The number of pieces one above the other will, of course, vary with the rate of feed at 36, which is regulated in accordance with the sizes, and the moving stream of particles may have the height of one piece up to ten pieces or more. The gas is discharged at the outlet 32 and carries off moisture and heat.

While moving along the table the pieces receive microwave energy, and upon reaching the downstream end of the table fall between the walls 26 and 29 and are discharged through the outlet 37.

The gas flowing through and along the table 23 carries off heat and thereby limits the temperature due to the microwaves, thereby counteracting the deterioration due to these waves.

The length of the section can vary, and may, for example, be much longer than shown in relation to the height and breadth, e.g., lengths of 2 to 20 meters can be used. These and other specific numerical descriptions presented above are for illustration and not by way of limitation.

It will also be understood that changes can be made in the contour of the jet table 23, which need not be flat.

Referring to FIGS. 6–8, there is shown a second embodiment in which the applicator chamber comprises a number of serially connected and laterally spaced wave guide sections 39–42, interconnected by bend sections 43 and coupled to a microwave generator 44 and to a water load 45. The applicator sections have slot-shaped inlet and outlet openings such as the inlet opening 46 and outlet opening 47, all openings in the several sections being in alignment. A passive table 48, having low side walls 49, is mounted between these slots, and deflectors 50 and 51 are optionally provided to catch small particles that may stray upwards. Preferably the table 48–49 and the deflectors, or only the internal deflector 51, are made of material which is transparent to microwaves. While it is desirable to make the openings as narrows as possible while permitting the pieces to be treated to pass, there is no limitation on their lengths, which is the same as the width of the table.

A feed jet table 52, intervening jet tables 53–55 and a discharge jet table 56 are mounted at the level of the bottoms of the inlet and outlet openings and have gas passages 57, e.g., transverse slots as previously described but shown arranged in a single row. Each jet table has upstanding side walls 58 and a plenum chamber 59 beneath it, to which gas under pressure is admitted through an inlet 60.

In operation, the microwave generator 44 being in operation, the pieces are charged onto the feed table 52 and propelled to high velocities by the gas jets from the passages 57. The pieces enter the inlet opening 46 and move by momentum along the table 48 as a dilute bed. Upon emerging through the outlet opening 47 they are engaged by gas jets from the intervening jet table 53 and swept as a dilute bed by gas at a relative velocity sufficient to disrupt the boundary layer and remove surface phenomena, the spaced relation between pieces being maintained. This action is repeated in the successive wave guides 40, 41 and 42 and subsequent jet tables, the pieces being finally swept with gas on the discharge jet table 56.

It is evident that while only four applicator sections are shown, the number may be varied, either decreased or increased, in accordance with space and economic considerations. The decay in field intensity along each wave guide must be taken into account. For example, with a loss of 1 db in field strength per section, six to ten sections would often be used.

Referring to FIGS. 9 and 10, there is shown a third embodiment in which the applicator chamber is a cavity 61 which confines microwaves and the metallic bottom wall 62 of this chamber (or a plate of microwave-transparent material lying thereon) constitutes the internal jet table means. This table means has a plurality of small gas passages 63 of any desired form and outline. For example, they can be formed by depressing trapezoidal tabs 64 along incisions at the upstream edge and two sides of each tab. There may, for example, typically be between 400 and 2,800 such passages per sq. meter of area. Gas under pressure is supplied to the underside of the jet table means by a plenum chamber 65. The opposed end walls 66 and 67 have inlet and outlet openings 68 and 69, situated just above the bottom wall 62, and a feed and a discharge jet table, 70 and 71, are mounted outside the chamber in alignment with these openings. The tables have upstanding side walls 72 and gas passages 73 of any suitable shape, e.g., as slots described for FIGS. 6–8, and plenum chambers 74 and 75, which are in communication with the chamber 65. The openings 68 and 69 and the jet tables 70 and 71 extend the full width of the chamber 61; when they are narrower, upstanding guide walls, similar to the walls 72 and made of material transparent to microwaves are provided within the chamber to confine the material to the width of the openings. Gas is supplied to the three plenum chambers by a blower 76. The material to be treated is supplied to the feed table 70 from a source 77 at a rate controlled by a flow controller, represented by a star feeder 78, preferably at a point spaced downstream from the end of the table, to provide several passages 73 in advance of the charge zone.

The end wall 66 has an opening 79 through which microwave energy from a microwave generator 80 is introduced through an interconnecting wave guide 81. One or more dummy loads 82, 83, are provided. The size of the chamber and the locations of the opening 79 and dummy loads are selected to cause microwave energy to move about the chamber and transfer energy to the work pieces on the bottom wall 62. The top of the chamber has a vent, e.g., formed as a bundle of tubes 84. Deflectors 85 and 86 may be provided at the openings 68 and 69.

In operation, the material to be treated is fed by the controller 78 onto the feed jet table 70 and propelled by gas flowing there through into the inlet opening 68. It is moved under gas propulsion as a dilute bed across the jet table means 62 and is simultaneously exposed to microwave energy and swept by gas from the chamber 65. The treated material is propelled by the gas through the outlet opening 69 and then moved by the gas from the chamber 75 on the discharge jet table 71.

To reduce radiation from the openings and 69 the jet tables 70 and 71 may be made of metal and provided with metallic top plates 87 and 88, to form tube-like passages extending outwardly from the walls 66 and 67.

It will be understood that the chamber of FIG. 9 may contain elements for causing the desired propagation of the microwaves. These do not pertain to the instant invention and are not, therefore, shown.

Because the gas flowing through the gas passages in the jet tables has the capability of rapidly influencing the surface moisture and temperature of the pieces, it is evident that the gas may in certain situations be cooled or heated. For example, the several plenum chambers may be supplied with gas of different temperatures; thus, if the process is one of cooking, the feed jet tables 52 (FIGS. 6 and 7) and 70 (FIG. 9) may be supplied with warm air and air at ambient or sub-ambient temperature may be supplied to the other plenum chambers. Further, when air is used as the gas it may be desirable in certain climates or situations to dehumidify the air before passing it through the jet table.

I claim as my invention:

1. Method of treating separate pieces of material with microwaves which comprises the steps of propagating microwave energy within a microwave-confining chamber, passing said pieces into and out of said chamber through spaced inlet and outlet openings in the chamber, moving said pieces individually between said openings on a stationary internal table surface situated within the chamber, and sweeping the surfaces of said pieces after they have absorbed at least some microwave energy by a plurality of gas jets while maintaining a separation between said pieces of at least one diameter of the pieces.

2. Method as defined in claim 1 wherein at least some of said gas jets emanate upwards through said table with major flow components toward the outlet opening, and said pieces are maintained in the stated separation while within the chamber, whereby said pieces are propelled and swept by said gas jets while within the chamber.

3. Method as defined in claim 1 wherein said pieces are moved away from the chamber after discharge therefrom through said outlet opening on a stationary discharge jet table by flowing through the discharge table a plurality of gas jets having major flow components along the table away from the chamber while maintaining said pieces in the stated separation, whereby said pieces are propelled and swept by said gas jets while outside of the chamber.

4. Method as defined in claim 1 wherein said pieces are supplied to the inlet opening by a stationary feed jet table by flowing through the feed table a plurality of gas jets having major flow components along the table toward the chamber, thereby propelling the pieces and moving them into the inlet opening with momentum.

5. Method as defined in claim 1 wherein said chamber includes a plurality of laterally spaced, serially connected wave guide sections positioned side by side to form a succession of applicator zones, each section having lateral inlet and outlet openings and the several openings being in substantial alignment, said pieces are introduced into the inlet opening of the first section in the succession, moved through the several sections on internal table surfaces and moved between adjacent sections on intervening tables by flowing a plurality of gas jets having major flow components along the intervening tables in the direction of movement of the pieces while maintaining said pieces in the stated separation, whereby said pieces are propelled and swept by said gas currents while moving between adjacent sections.

6. Method as defined in claim 1 wherein said pieces are particles having diameters less than 2 cm., the treatment is to dry the material, and the frequency of said microwave energy is between 0.1 and 100 gHz.

7. In a microwave treating system for subjecting separate pieces of material to the action of microwaves, the combination of:
  (a) a microwave-confining chamber adapted to be connected to a microwave generator, said chamber having spaced inlet and outlet openings;
  (b) means for feeding said pieces into the chamber through said inlet opening and for removing the pieces after discharge through the outlet opening; and
  (c) stationary means for guiding said pieces through the chamber between said inlet and outlet openings and for sweeping said pieces with gas and propelling them while maintaining a separation between the pieces equal to at least one diameter thereof, including a jet table formed with a plurality of gas passages directed to emit jets having major flow components along the table in the direction of movement of the pieces and means for supplying gas under pressure to the underside of the table.

8. The combination defined in claim 7 wherein at least a part of said stationary means is an internal table means provided by said chamber, said internal table means has a plurality of said gas passages and means for supplying gas under pressure to the underside thereof, whereby said pieces are swept with gas and propelled by gas jets emanating from said passages while within the chamber and said chamber has a vent for discharging gas therefrom.

9. The combination defined in claim 8 wherein said internal table means is the lower wall of the chamber and the means for supplying gas to the underside thereof includes a plenum chamber situated outside and beneath the chamber.

10. The combination defined in claim 8 wherein said internal table means is a separate plate which is spaced between the upper and lower walls of the chamber and said plenum chamber is situated within the chamber.

11. The combination defined in claim 10 wherein said plate is of material which is substantially transparent to microwaves.

12. The combination defined in claim 8 wherein said chamber is an elongated microwave guide and said guide and the internal table means have gradients less than 45° to the horizontal in the direction of movement of the pieces, said inlet opening is formed above said internal table for the downward movement of the pieces thereonto at one end of the table means, and the outlet opening is formed below the table means at the other end thereof for the downward discharge of the pieces therethrough.

13. The combination defined in claim 8 wherein said chamber is an elongated microwave guide and said guide and the internal table means have gradients less than 45° to the horizontal in the direction of movement of the pieces, and said inlet and outlet openings are slot-shaped and are situated in opposed walls of the wave guide at the ends of said internal table means.

14. The combination defined in claim 7 wherein said chamber is formed by a plurality of laterally spaced microwave guide sections which are connected in series and are positioned side by side to form a succession of treating chambers, each section being formed with slot-shaped inlet and outlet openings and the several openings being substantially in alignment, and said stationary means includes:
  (a) internal table means situated within each guide section having its upper surface substantially at the level of the bottoms of the openings; and
  (b) an intervening table outside said sections and interconnecting the lower portions of the openings of adjacent sections, each said intervening table having a plurality of said gas passages, whereby said pieces are swept with gas and propelled by said gas jets while moving between adjacent sections.

15. The combination defined in claim 14 wherein said internal table means are plates of material which is substantially transparent to microwaves and are situated between the upper and lower walls of the respective wave guide sections.

16. In the combination defined in claim 14, means for charging said pieces with a forward velocity into the inlet opening of the first section of the succession, said internal table means being imperforate, whereby said internal table means are passive and the pieces are moved thereover by momentum imparted thereto by said charging means and by the said intervening tables.

References Cited
UNITED STATES PATENTS

| | | | |
|---|---|---|---|
| 3,012,331 | 12/1961 | Oholm et al. | 34—57T |
| 3,409,447 | 11/1968 | Jeppson | 34—1 |
| 3,434,220 | 3/1969 | Forster | 34—1 |
| 3,394,463 | 7/1968 | Futer | 34—10 |

CHARLES SUKALO, Primary Examiner

U.S. Cl. X.R.

34—57; 219—10